(12) United States Patent
Pardue

(10) Patent No.: US 8,625,973 B2
(45) Date of Patent: Jan. 7, 2014

(54) METHOD AND APPARATUS FOR OPERATING A VIDEO SYSTEM

(75) Inventor: William David Pardue, Dawsonville, GA (US)

(73) Assignee: Verint Systems, Inc., Santa Clara, CA (US)

( * ) Notice: Subject to any disclaimer, the term of this patent is extended or adjusted under 35 U.S.C. 154(b) by 559 days.

(21) Appl. No.: 12/915,941

(22) Filed: Oct. 29, 2010

(65) Prior Publication Data

US 2011/0102634 A1    May 5, 2011

Related U.S. Application Data

(60) Provisional application No. 61/256,463, filed on Oct. 30, 2009, provisional application No. 61/256,476, filed on Oct. 30, 2009, provisional application No. 61/256,506, filed on Oct. 30, 2009, provisional application No. 61/256,535, filed on Oct. 30, 2009, provisional application No. 61/256,553, filed on Oct. 30, 2009, provisional application No. 61/256,569, filed on Oct. 30, 2009.

(51) Int. Cl.
*H04N 5/917*    (2006.01)
*H04N 5/91*    (2006.01)

(52) U.S. Cl.
USPC .......................................... 386/328; 386/326

(58) Field of Classification Search
USPC ........... 348/231; 386/326, 328, 329, 330, 332
See application file for complete search history.

(56) References Cited

U.S. PATENT DOCUMENTS

2009/0290855 A1* 11/2009 Kowalski et al. ............. 386/109

* cited by examiner

*Primary Examiner* — Robert Chevalier
(74) *Attorney, Agent, or Firm* — Meunier Carlin & Curfman

(57) ABSTRACT

A method for operating a video system to generate and store encoded video comprising a plurality of key frames and a plurality of delta frames is provided. The method includes capturing video data comprising a plurality of frames of a scene, and selecting a fundamental view of at least a portion of the scene contained in the plurality of frames. The method also includes generating the plurality of key frames from a first subset of the plurality of frames and the fundamental view of at least the portion of the scene, generating the plurality of delta frames from a second subset of the plurality of frames and the plurality of key frames, and transferring the encoded video for delivery to storage.

18 Claims, 11 Drawing Sheets

700

Fundamental View
702

| $K_1$ | $K_2$ | $K_3$ | $K_4$ | $K_5$ | $K_6$ |
|---|---|---|---|---|---|
| $K_7$ | $K_8$ | $K_9$ | $K_{10}$ | $K_{11}$ | $K_{12}$ |
| $K_{13}$ | $K_{14}$ | $K_{15}$ | $K_{16}$ | $K_{17}$ | $K_{18}$ |
| $K_{19}$ | $K_{20}$ | $K_{21}$ | $K_{22}$ | $K_{23}$ | $K_{24}$ |

METHOD AND APPARATUS FOR OPERATING A VIDEO SYSTEM

RELATED APPLICATIONS

This application hereby claims the benefit of and priority to U.S. Provisional Patent Application No. 61/256,463, titled "METHOD AND APPARATUS TO LEVERAGE VIDEO ANALYSIS TO OPTIMIZE VIDEO COMPRESSION", filed on Oct. 30, 2009, and which is hereby incorporated by reference in its entirety.

This application also hereby claims the benefit of and priority to U.S. Provisional Patent Application No. 61/256,476, titled "METHOD AND APPARATUS TO ENCODE AND STORE VARIABLE RESOLUTION IMAGES PLUS METADATA", filed on Oct. 30, 2009, and which is hereby incorporated by reference in its entirety.

This application also hereby claims the benefit of and priority to U.S. Provisional Patent Application No. 61/256,506, titled "METHOD AND APPARATUS TO USE METADATA TO SUPPORT RAPID SEARCHING", filed on Oct. 30, 2009, and which is hereby incorporated by reference in its entirety.

This application also hereby claims the benefit of and priority to U.S. Provisional Patent Application No. 61/256,535, titled "METHOD AND APPARATUS TO VARY THE FRAME RATE AS NEEDED TO CAPTURE ACTIVITY", filed on Oct. 30, 2009, and which is hereby incorporated by reference in its entirety.

This application also hereby claims the benefit of and priority to U.S. Provisional Patent Application No. 61/256,553, titled "METHOD AND APPARATUS TO VARY THE KEY FRAME INTERVAL TO OPTIMIZE VIDEO STORAGE", filed on Oct. 30, 2009, and which is hereby incorporated by reference in its entirety.

This application also hereby claims the benefit of and priority to U.S. Provisional Patent Application No. 61/256,569, titled "METHOD AND APPARATUS TO STORE A MASTER REFERENCE FRAME IN EACH FILE", filed on Oct. 30, 2009, and which is hereby incorporated by reference in its entirety.

TECHNICAL BACKGROUND

Camera manufacturers have begun offering digital cameras in a wide variety of resolutions ranging up to several megapixels for video recording. These high resolution cameras offer the opportunity to capture increased detail, but potentially at a greatly increased cost in terms of central processing unit (CPU) power, bandwidth, and storage required for high resolution images In order to build the most cost effective solutions for video applications, system designers must leverage available technology to capture and store optimal video evidence as opposed to simply recording video. In the past, video analysis algorithms, video compression algorithms, and video storage methods have all been designed and developed independently.

OVERVIEW

A method for operating a video system to generate and store encoded video comprising a plurality of key frames and a plurality of delta frames is provided. The method includes capturing video data comprising a plurality of frames of a scene, and selecting a fundamental view of at least a portion of the scene contained in the plurality of frames. The method also includes generating the plurality of key frames from a first subset of the plurality of frames and the fundamental view of at least the portion of the scene, generating the plurality of delta frames from a second subset of the plurality of frames and the plurality of key frames, and transferring the encoded video for delivery to storage.

A video system to generate and store encoded video comprising a plurality of key frames and a plurality of delta frames is provided. The video system includes a video capture device configured to capture video data comprising a plurality of frames of a scene, a memory configured to store the encoded video, and a video processor coupled with the video capture device and the memory. The video processor is configured to select a fundamental view of at least a portion of the scene contained in the plurality of frames, and generate the plurality of key frames from a first subset of the plurality of frames and the fundamental view of at least the portion of the scene. The video processor is also configured to generate the plurality of delta frames from a second subset of the plurality of frames and the plurality of key frames, and transfer the encoded video to the memory.

BRIEF DESCRIPTION OF THE DRAWINGS

FIG. 7 illustrates a diagram of memory containing example encoded video data.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 2:
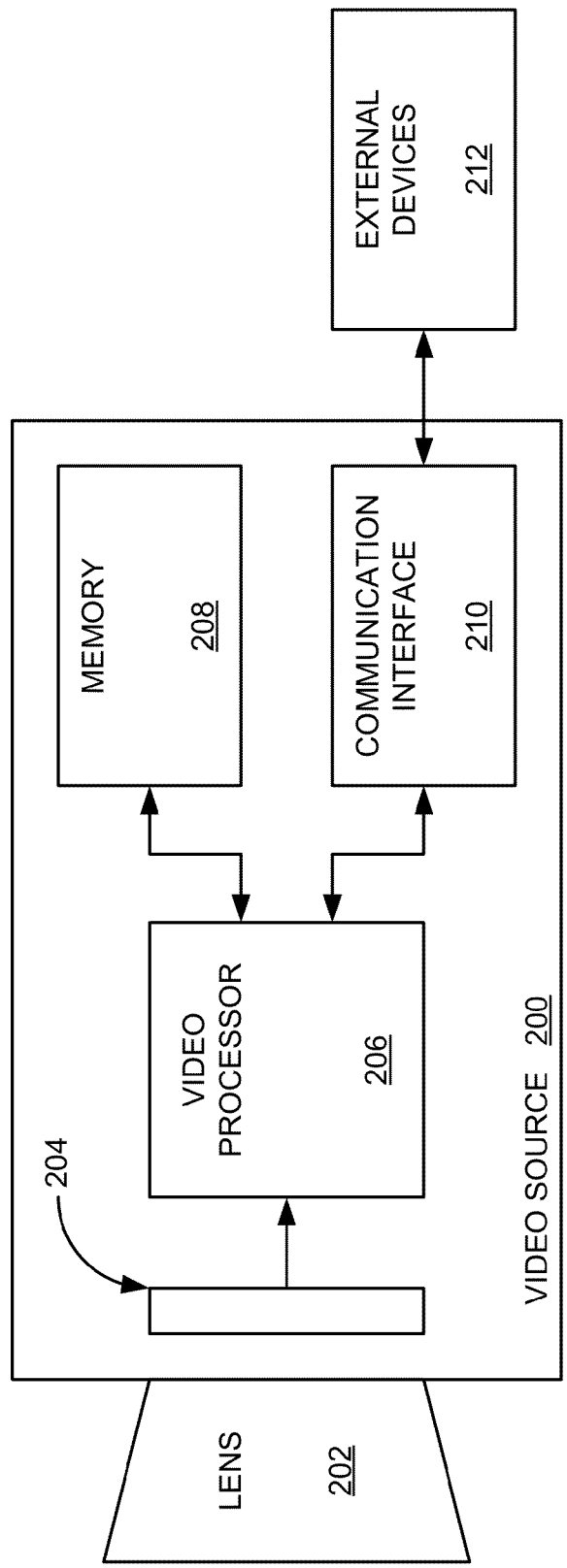
FIG. 2 illustrates a block diagram of an example of a video source.

For fixed cameras, such as that illustrated in FIG. 2, viewing a scene with consistent lighting, there may be a great deal of redundancy between key frames. Many of the macroblocks (or portions of the scene) in each key frame will depict unchanging portions of the camera view. Repeatedly encoding those fixed portions of the scene wastes space. However, it is necessary to periodically encode a key frame in order to support efficient random access to any video image.

To reduce the video redundancy for fixed cameras, a possible approach would be as follows:

Identify the unchanging portions of the camera view. Save macroblocks (or portions of the scene) from one or more images to build up a reference image (or fundamental view). Each macroblock within the reference image (or fundamental view) should be the most common view of that portion of the picture.

Each video file will start with a master reference image (fundamental view) that uses intra-encoding. This master reference image (fundamental view) is never displayed—it only serves as raw material for encoding other images.

The frame at the beginning of each group of pictures (GOP) will be encoded using inter-encoding from the reference frame instead of the typical intra-encoding used for key frames. That is, calculate and store the differences between the reference image and the current image in exactly the same way a delta frame would be encoded. If there are a lot of closely matching macroblocks between the reference image and the image being encoded, then the resulting compressed image should be significantly smaller than a key frame.

For any macroblock, the encoder always has the choice of using intra-encoding if the encoder is unable to find a suitable motion vector. Therefore, encoding the initial frame of a GOP using this approach should not create results that are worse than standard key frame encoding. Some macroblocks within the reference image could be flagged to indicate that the encoder should always use intra-encoding for that macroblock. For example, macroblocks in regions of the camera view that have constant activity might use that flag.

To improve encoding efficiency for the first frame of each GOP, the encoder could bypass motion vector searching and use the following simpler method. Encode each macroblock using two approaches and retain the best (smallest) of the two encoded results:

1. Intra-encoding (the method normally used for all macroblocks in a key frame)
2. Inter-encoding relative to the master reference image, where the only motion vector evaluated is 0, 0 (no horizontal or vertical displacement).

If there is no significant change between a macroblock in the reference image and the macroblock being encoded, the encoder can skip the macroblock entirely. During decoding, when a macroblock is skipped in the encoded image the decoder would simply copy the macroblock from the master reference image.

Disclosed herein is a video system. Video system 100 includes video source 102, video processing system 104, and video storage system 106. Video source 102 is coupled to video processing system 104, and video processing system 104 is coupled to video storage system 106. The connections between the elements of video system 100 may use various communication media, such as air, metal, optical fiber, or some other signal propagation path—including combinations thereof. They may be direct links, or they might include various intermediate components, systems, and networks.

In some embodiments, a large number of video sources may all communicate with video processing system 104, this results in bandwidth concerns as video processing system 104 may have an input port incapable of receiving full resolution, real time video from all of the video sources. In such a case, it is desirable to incorporate some video processing functionality within each of the video sources such that the bandwidth requirements between the various video sources and video processing system 104 are reduced. An example of such a video source is illustrated in FIG. 2.

Figure 5:
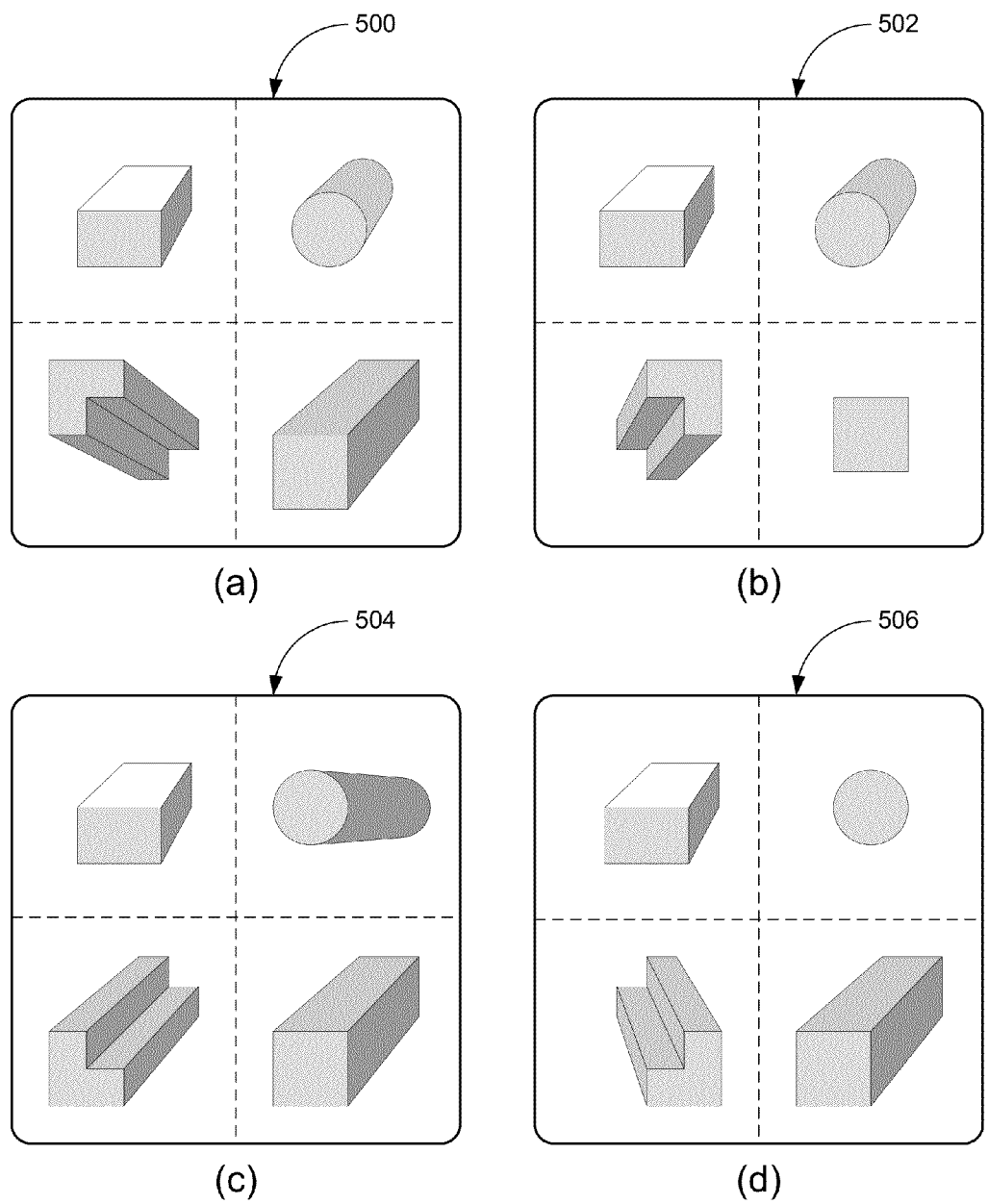
FIG. 5 illustrates an example of a plurality of frames of a scene.
Figure 6:
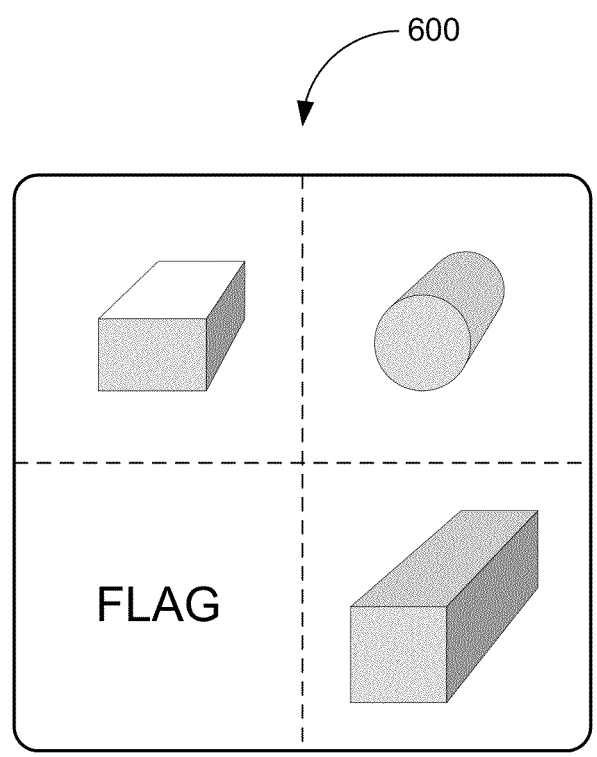
FIG. 6 illustrates an example fundamental view of a scene.

In this example embodiment, video source 102 captures video data comprising a plurality of frames of a scene and transfers the video data to video processing system 104. Video processing system 104 selects a fundamental view of at least a portion of the scene contained in the plurality of frames. This portion of the scene may include one or more macroblocks of the scene. A portion of the scene may be selected for inclusion in the fundamental view based on the most common content of the portion of the scene as illustrated in FIGS. 5 and 6.

Video processing system 104 then generates a plurality of key frames from a first subset of the plurality of frames and the fundamental view of at least a portion of the scene. Video processing system 104 then generates a plurality of delta frames from a second subset of the plurality of frames and the plurality of key frames. For example, video processing system 104 may break the incoming video data into a plurality of groups of pictures (or groups of frames). The first frame of each group of frames may be selected for encoding as a key frame, while the remaining frames of each group of frames may be selected for encoding as delta frames.

Key frames are encoded based on the fundamental view and portions of the key frame substantially similar to corresponding portions of the fundamental view may be encoded as pointers to the particular portion of the fundamental view instead of intra-encoding the portion. Thus, key frames which reference portions of the fundamental view will be smaller in memory size than key frames which include intra-encoding of the entire frame.

For example, in a scene having a background with a number of people walking past, each portion of the scene would have a lot of frames capturing the background a few frames capturing people. The most common content of each portion of the scene would then most likely contain just the background and no people.

Video processing system 104 generates a fundamental view from the most common content captured in each portion of the scene. In this example, the frames capturing the background would be much more common than the frames capturing people, and the fundamental view would contain the background without any people.

Figure 1:
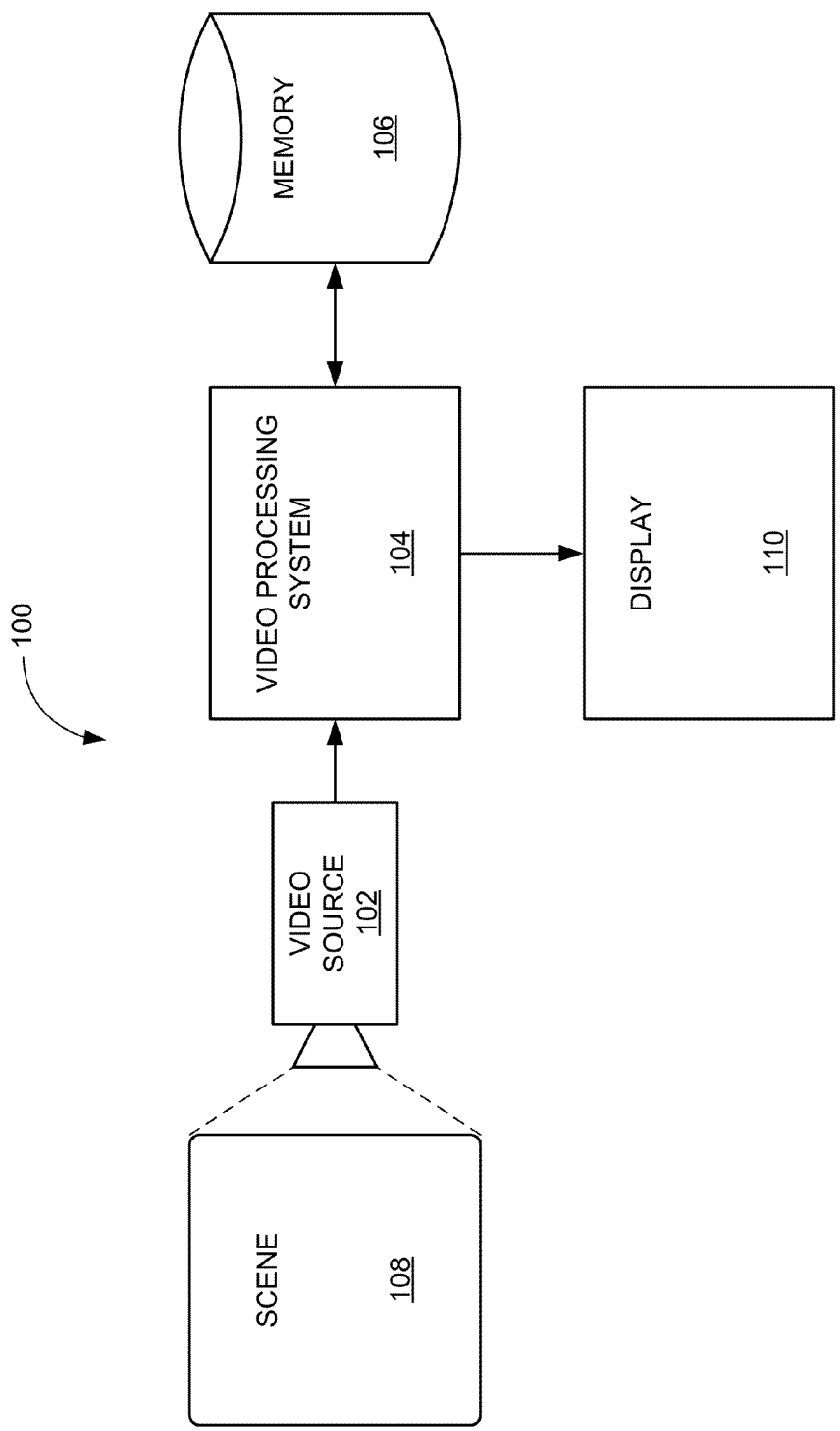
FIG. 1 illustrates a block diagram of an example of a video system.

FIG. 2 is a block diagram of an example of a video source 200, such as video source 102 from FIG. 1. Video source 200 includes lens 202, sensor 204, processor 206, memory 208, and communication interface 210. Lens 202 is configured to focus an image of a scene on sensor 204. Lens 202 may be any type of lens, pinhole, zone plate, or the like able to focus an image on sensor 204. Sensor 204 then digitally captures video of the scene and passes the video images to processor 206. Processor 206 is configured to store some or all of the video in memory 208, process the video, and send the processed video to external devices 212 through communication interface 210. In some examples, external devices 212 include video processing system 104 and video storage system 106.

In this example embodiment, video source 200 captures video data comprising a plurality of frames of a scene. Lens 202 and sensor 204 capture the video data and transfer the video data to processor 206. Processor 206 selects a fundamental view of at least a portion of the scene contained in the plurality of frames. Processor 206 generates a plurality of key frames from a first subset of the plurality of frames and the fundamental view of at least a portion of the scene. Processor 206 also generates a plurality of delta frames from a second subset of the plurality of frames, the plurality of key frames, and preceding delta frames. For example, in a scene having a background with a number of people walking past, each portion of the scene would have a lot of frames capturing the background a few frames capturing people.

Processor 206 then generates a fundamental view from the most common content captured in each portion of the scene. Other examples may use criteria other than the most common content for determining which portions of the scene to include in the fundamental view. For example, some embodiments may determine how long a scene has been unchanged. In this example, the portions of the scene capturing the background would be much more common than the frames capturing people, and the fundamental view would contain the background without any people.

Figure 3:
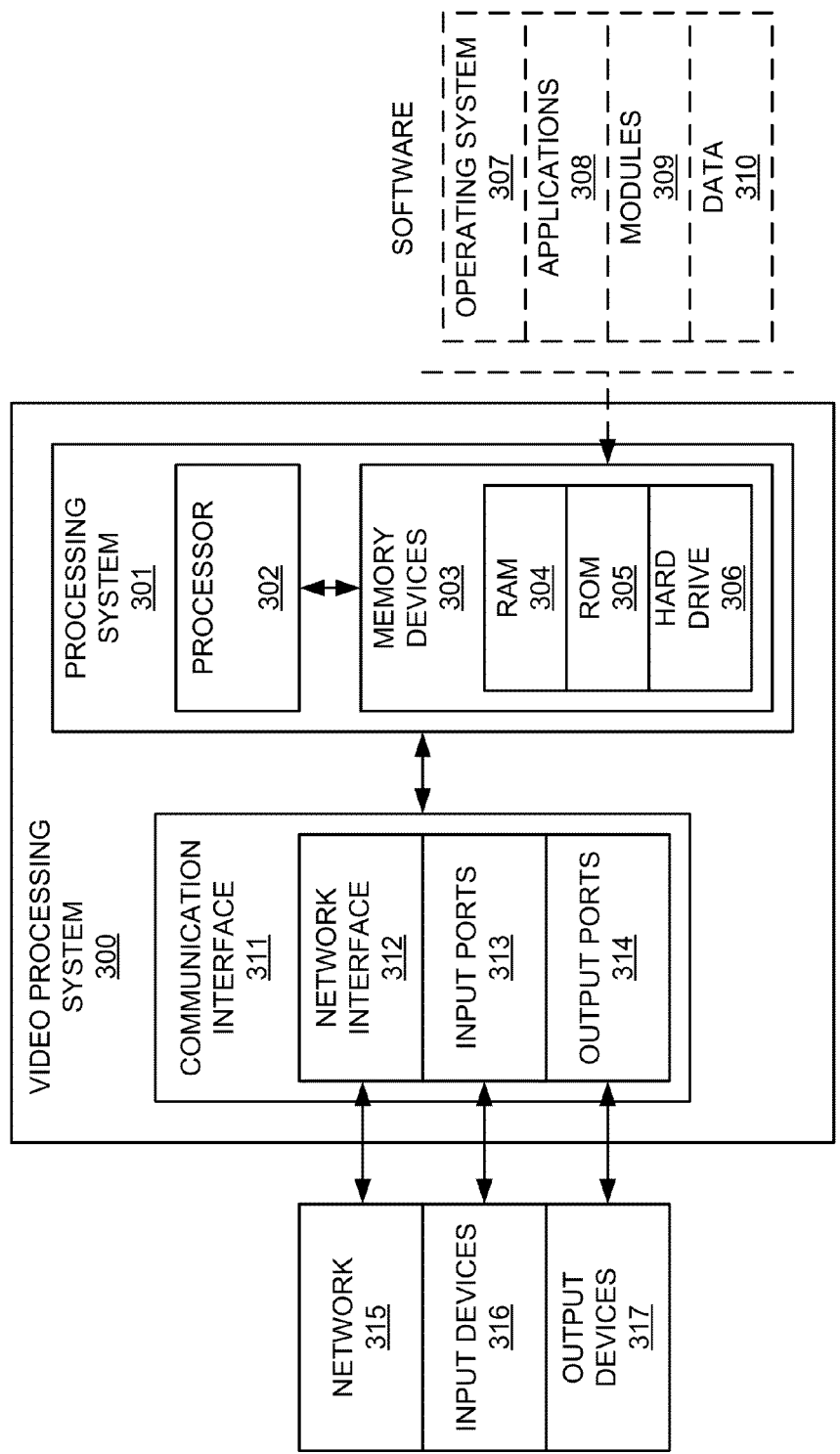
FIG. 3 illustrates a block diagram of an example of a video processing system.
Figure 4:
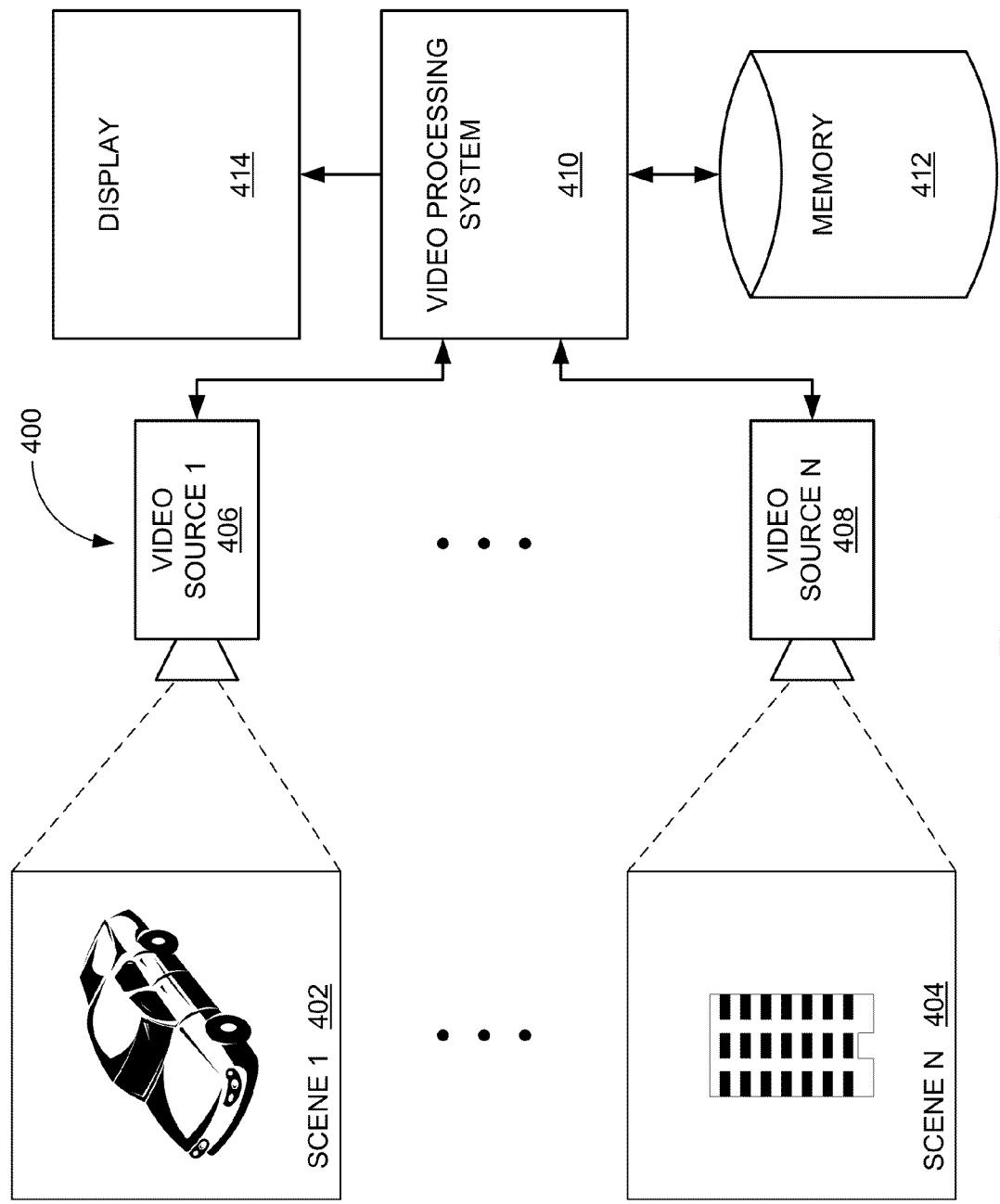
FIG. 4 illustrates a block diagram of an example of a video system.

Many embodiments include a video processing system such as video processing system 104 from FIG. 1, processor 206 from FIG. 2 and video processing system 410 from FIG. 4. Any of these video processing systems may be implemented on a computer system such as that shown in FIG. 3. Video processing system 300 includes communication interface 311, and processing system 301. Processing system 301 is linked to communication interface 311 through a bus. Processing system 301 includes 302 and memory devices 303 that store operating software.

Communication interface 311 includes network interface 312, input ports 313, and output ports 314. Communication interface 311 includes components that communicate over communication links, such as network cards, ports, RF transceivers, processing circuitry and software, or some other communication devices. Communication interface 311 may be configured to communicate over metallic, wireless, or optical links. Communication interface 311 may be configured to use TDM, IP, Ethernet, optical networking, wireless protocols, communication signaling, or some other communication format—including combinations thereof.

Network interface 312 is configured to connect to external devices over network 315. In some examples these network devices may include video sources and video storage systems as illustrated in FIGS. 1 and 4. Input ports 313 are configured to connect to input devices 316 such as a keyboard, mouse, or other user input devices. Output ports 314 are configured to connect to output devices 317 such as a display, a printer, or other output devices.

Processor 302 includes microprocessor and other circuitry that retrieves and executes operating software from memory devices 303. Memory devices 303 include random access memory (RAM) 304, read only memory (ROM) 305, a hard drive 306, and any other memory apparatus. Operating software includes computer programs, firmware, or some other form of machine-readable processing instructions. In this example, operating software includes operating system 307, applications 308, modules 309, and data 310. Operating software may include other software or data as required by any specific embodiment. When executed by processor 302, operating software directs processing system 301 to operate video processing system 300 as described herein.

In this example embodiment, one or more video sources (input devices 316) capture video data comprising a plurality of frames of a scene. This video data is transferred to processing system 301 through input ports 313 and communication interface 311. Processor 302 selects a fundamental view of at least a portion of the scene contained in the plurality of frames. Processor 302 generates a plurality of key frames from a first subset of the plurality of frames and the fundamental view of at least a portion of the scene. Processor 302 also generates a plurality of delta frames from a second subset of the plurality of frames, the plurality of key frames, and preceding delta frames. For example, in a scene having a background with a number of people walking past, each portion of the scene would have a lot of frames capturing the background a few frames capturing people.

Processor 302 then generates a fundamental view from the most common content (or other criteria) captured in each macroblock. In this example, the frames capturing the background would be much more common than the frames capturing people, and the fundamental view would contain the background without any people.

FIG. 4 illustrates a block diagram of an example of a video system 400. Video system 400 includes video source 1 406, video source N 408, video processing system 410, and video storage system 412. Video source 1 406 is configured to capture video of scene 1 402, while video source N 408 is configured to capture video of scene N 404. Video source 1 406 and video source N 408 are coupled to video processing system 410, and video processing system 410 is coupled to video storage system 412. The connections between the elements of video system 400 may use various communication media, such as air, metal, optical fiber, or some other signal propagation path—including combinations thereof. They may be direct links, or they might include various intermediate components, systems, and networks.

In some embodiments, a large number of video sources may all communicate with video processing system 410, this results in bandwidth concerns as video processing system 410 may have an input port incapable of receiving full resolution, real time video from all of the video sources. In such a case, it is desirable to incorporate some video processing functionality within each of the video sources such that the bandwidth requirements between the various video sources and video processing system 410 are reduced. An example of such a video source is illustrated in FIG. 2.

In some embodiments including a large number of video sources it may be advantageous to configure the video sources to create fundamental views for the video data that they capture. In other embodiments, the video sources may transfer the raw video data to video processing system 410 for creating fundamental views for the video data and storage in video storage 412.

FIG. 5 illustrates an example of a plurality of frames of a scene. In this example embodiment, four frames 500, 502, 504, and 506 of a scene are illustrated in FIGS. 5 (*a*), (*b*), (*c*), and (*d*). The scene is divided into four portions (or macroblocks). The upper left portion of each frame contains an unchanging view of a rectangular block. Thus, the most common view of the upper left portion of the scene is the view of the rectangular block.

The upper right portion of each frame contains a changing view of a cylinder. Frames 500 and 502 contain identical views of the cylinder, while frames 504 and 506 contain different views of the cylinder. Thus, frames 500 and 502 contain the most common view of the cylinder in the upper right portion of the scene.

The lower right portion of each frame contains a changing view of a rectangular box. Frames 500, 504, and 506 contain identical views of the rectangular box, while frame 502 contains an end view of the rectangular box. Thus frames 500, 504, and 506 contain the most common view of the rectangular box in the lower right portion of the scene.

The lower left portion of each frame contains a changing view of an L-shaped rod. Frames 500, 502, 504, and 506 each contain a different view of the L-shaped rod. Thus, in this portion of the scene there is no most common view of the L-shaped rod in the lower left portion of the scene.

FIG. 6 illustrates an example fundamental view of the scene from FIG. 5. In this example, a fundamental view 600 is assembled from the most common views of the portions of the scene illustrated in FIG. 5. The upper left portion of the fundamental view 600 contains a view of the rectangular box as captured in any of frames 500, 502, 504, or 506. The upper right portion of the fundamental view 600 contains a view of the cylinder as captured in either of frames 500 or 502. The lower right portion of the fundamental view 600 contains a view of the rectangular box as captured in any of frames 500, 504, or 506. Since there was no most common view of the lower left portion of the scene this portion is flagged in the fundamental view 600.

When key frames are encoded based upon fundamental view 600, the upper left, upper right, and lower right portions of each key frame will contain any differences between the key frame portions and the corresponding portions of fundamental view 600. The lower left portion of each key frame will be intra-encoded since there is no most common view of this portion of the scene. Other embodiments may use other criteria for deciding which frames to use in constructing fundamental view 600.

FIG. 7 illustrates a diagram of memory containing example encoded video data. This example memory map 700 illustrates one possible method of encoding video data using a fundamental view 702. In this example, fundamental view 702 is stored in a file in the memory and key frames 704 with respect to fundamental view 702 follow in the file. Here no delta frames are generated, and each frame of the video data is inter-encoded with respect to fundamental view 702 and stored in the file following fundamental view 702.

Figure 8:
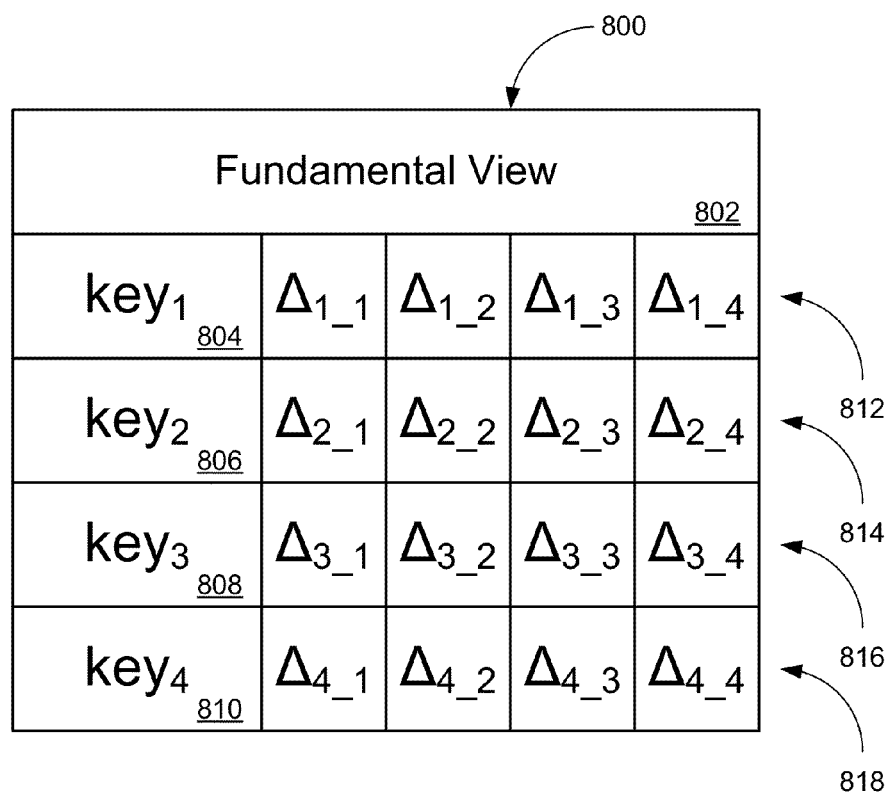
FIG. 8 illustrates a diagram of memory containing example encoded video data.

FIG. 8 illustrates a diagram of memory containing example encoded video data. This example memory map 800 illustrates another possible method of encoding video data using a fundamental view 702, key frames 804, 806, 808, and 810, and a plurality of delta frames. In this simple example, the video data is divided into four groups of pictures 812, 814, 816, and 818. Each group of pictures includes a key frame and four delta frames.

For example, the first group of pictures 812 includes key frame $key_1$ 804 and delta frames $\Delta_{1\_1}$, $\Delta_{1\_2}$, $\Delta_{1\_3}$, and $\Delta_{1\_4}$. Likewise, the second group of pictures 814 includes key frame $key_2$ 806 and delta frames $\Delta_{2\_1}$, $\Delta_{2\_2}$, $\Delta_{2\_3}$, and $\Delta_{2\_4}$. Likewise, the third group of pictures 816 includes key frame $key_3$ 808 and delta frames $\Delta_{3\_1}$, $\Delta_{3\_2}$, $\Delta_{3\_3}$, and $\Delta_{3\_4}$. Likewise, the fourth group of pictures 818 includes key frame $key_4$ 810 and delta frames $\Delta_{4\_1}$, $\Delta_{4\_2}$, $\Delta_{4\_3}$, and $\Delta_{4\_4}$. Each key frame is inter-encoded with respect to fundamental view 802, and each delta frame is inter-encoded with respect to its corresponding key frame and preceding delta frames.

Figure 9:
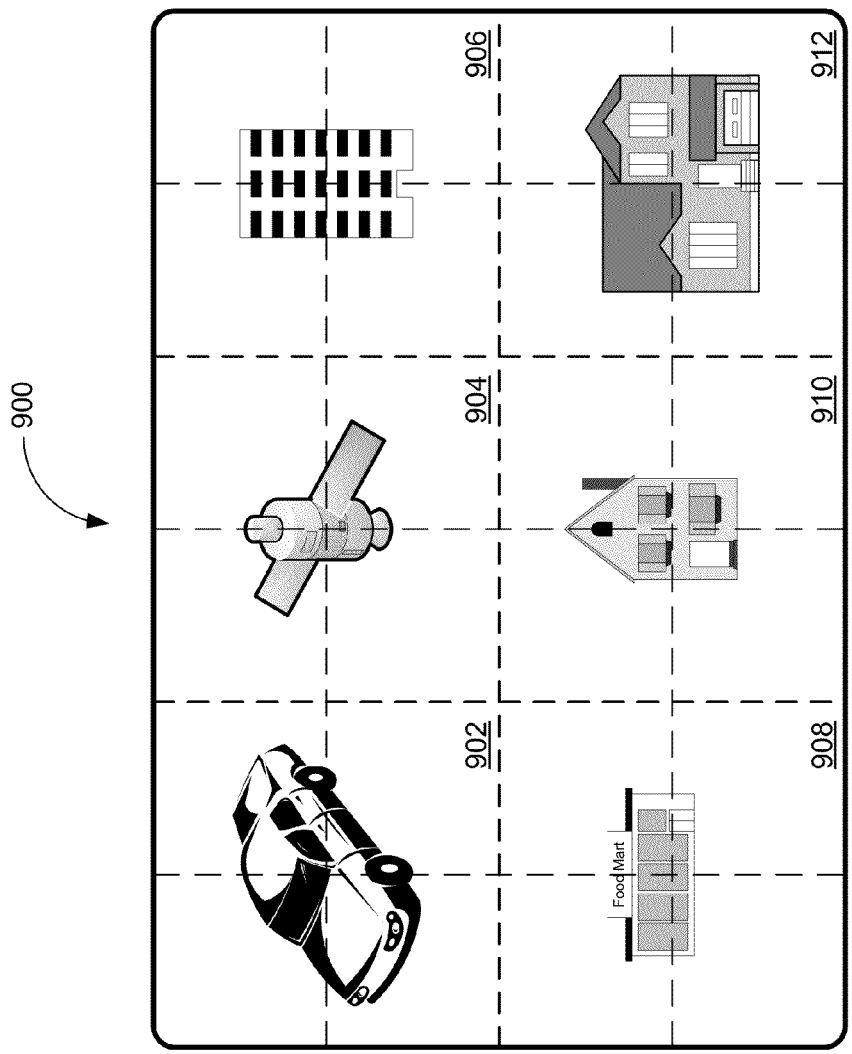
FIG. 9 illustrates an example view of a scene including a plurality of frames.

FIG. 9 illustrates an example view of a scene including a plurality of frames. In some embodiments, a video capture device may not be stationary, but may pan over a scene. Typically these pans are continuously repeated and each pan generates a plurality of different views of the scene. In the very simple example illustrated in FIG. 9, a video capture device repeatedly pans scene 900 taking six different views of scene 900 during each pan cycle.

In this example, scene 900 is covered by views 902, 904, 906, 908, 910, and 910. Each of these views is further divided into four portions. Since the panning motion of the video capture device is repeatable, a fundamental view may be constructed for each of views 902, 904, 906, 908, 910, and 910 using the techniques illustrated in FIGS. 5 and 6.

Figure 10:
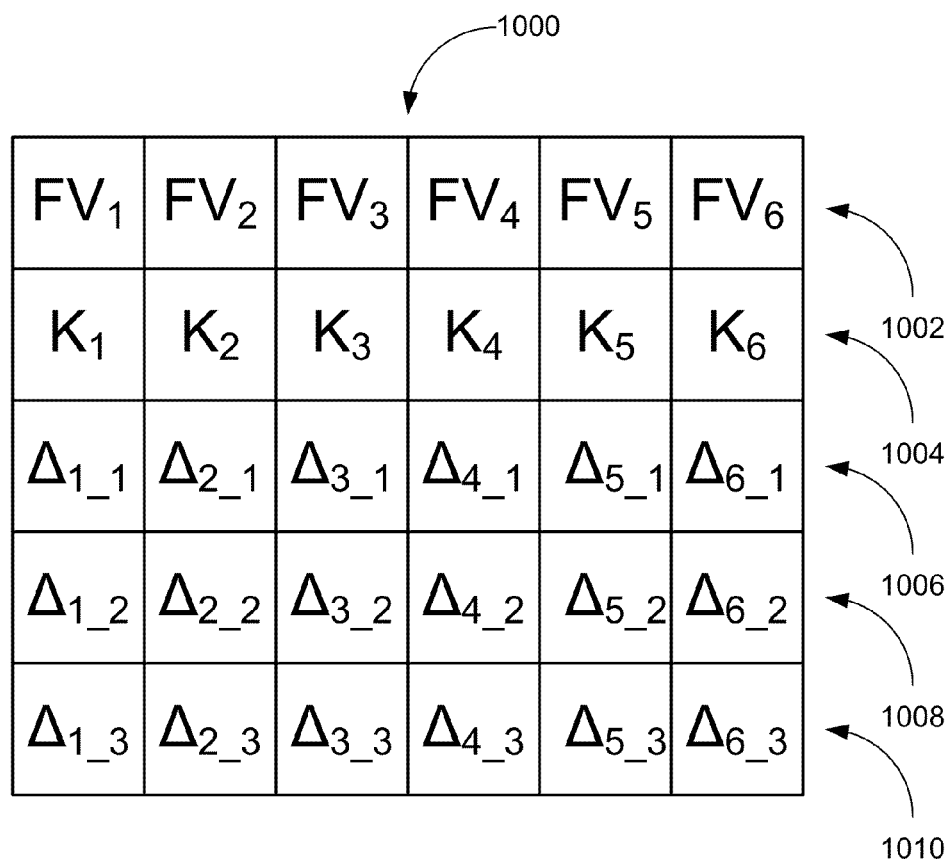
FIG. 10 illustrates a diagram of memory containing example encoded video data.

FIG. 10 illustrates a diagram of memory containing example encoded video data. This example memory map 1000 illustrates one possible method of encoding video data received from a video capture device panning over scene 900 from FIG. 9. Fundamental view $FV_1$ is generated for upper left view 902, fundamental view $FV_2$ is generated for upper middle view 904, fundamental view $FV_3$ is generated for upper right view 906, fundamental view $FV_4$ is generated for lower left view 908, fundamental view $FV_5$ is generated for lower middle view 910, and fundamental view $FV_6$ is generated for lower right view 912.

Following the fundamental views 1002 in memory map 1000 are the first six key frames $K_1$, $K_2$, $K_3$, $K_4$, $K_5$, and $K_6$ 1004 corresponding to each of the views. Following the key frames 1004 in memory map 1000 are the delta frames 1006, 1008, and 1010 associated with each of the key frames. Thus, multiple fundamental views may be used to encode regularly repeating panning video into a single file.

Figure 11:
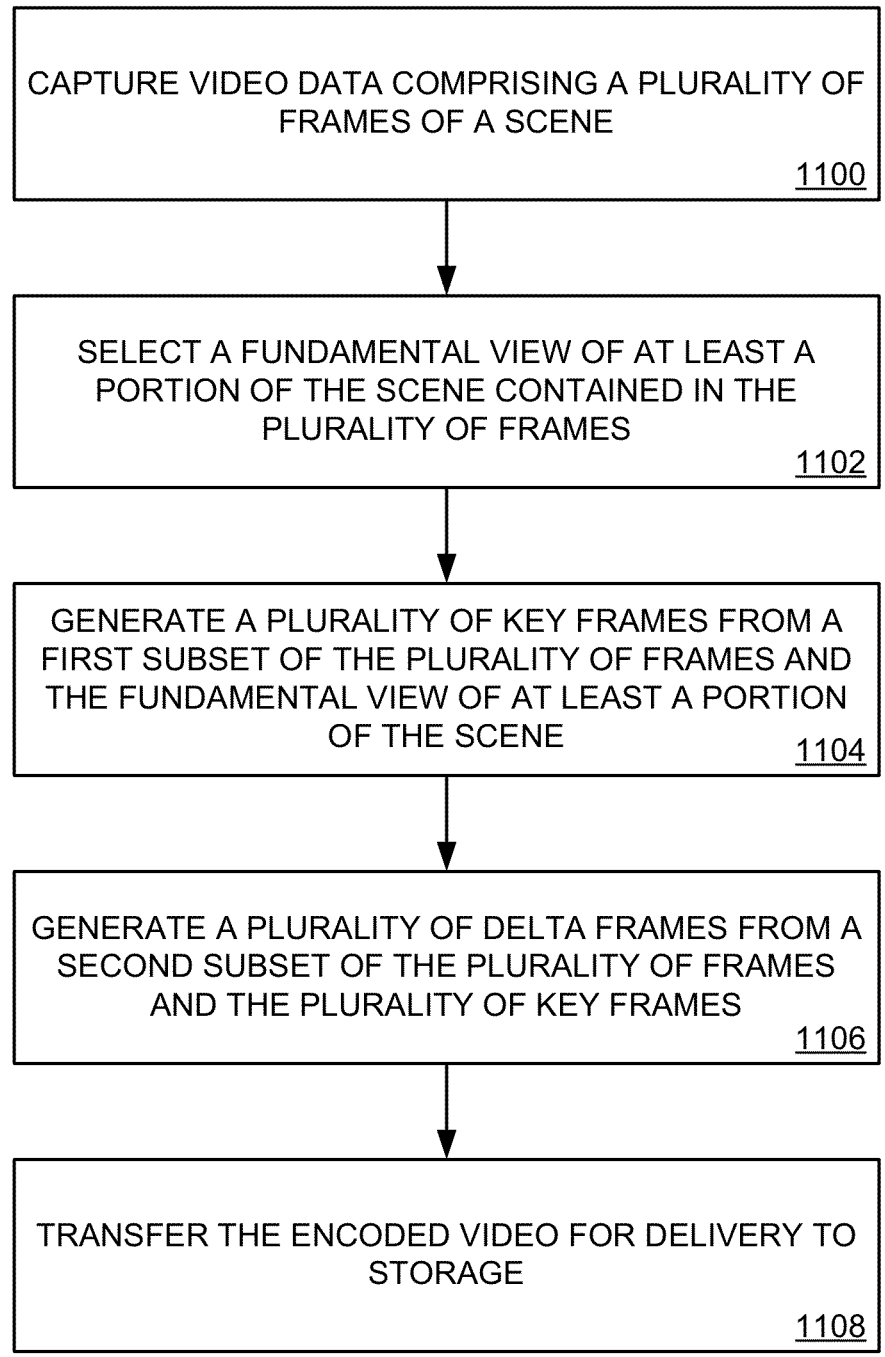
FIG. 11 illustrates a flow chart of a method of encoding video data.

FIG. 11 illustrates a flow chart of a method of encoding video data. In this example method to generate and store encoded video comprising a plurality of key frames and a plurality of delta frames, video data comprising a plurality of frames of a scene is captured, (operation 1100). A video processing system selects a fundamental view of at least a portion of the scene contained in the plurality of frames, (operation 1102).

The video processing system generates a plurality of key frames from a first subset of the plurality of frames and the fundamental view of at least a portion of the scene, (operation 1104). The video processing system generates a plurality of delta frames from a second subset of the plurality of frames, the plurality of key frames, and preceding delta frames, (operation 1106). Finally, the video processing system transfers the resulting encoded video for delivery to storage, (operation 1108).

Sophisticated video surveillance systems should not simply record video. Systems should be designed to gather optimal visual evidence that can be used to solve crimes or investigate incidents. Systems should use video analysis to identify specific types of activity and events that need to be recorded. The system should then tailor the recorded images to fit the activity—providing just the right level of detail (pixels per foot) and just the right image refresh rate for just long enough to capture the video of interest. The system should minimize the amount of space that is wasted storing images that will be of little value.

In addition to storing video images, the system should also store searchable metadata that describes the activity that was detected through video analysis. The system should enable users to leverage metadata to support rapid searching for activity that matches user-defined criteria without having to wait while the system decodes and analyzes images. All images should be analyzed one time when the images are originally captured (before compression) and the results of that analysis should be saved as searchable metadata.

Modern video compression methods like H.264 involve detecting changes between images and then determining the optimal way to encode those changes. A large image is divided into a grid of small images called macroblocks, where a typical macroblock size is 8×8 pixels. When the pixels of a macroblock have changed from one image to the next, the compression algorithm can choose between two methods of encoding the macroblock:

Inter-encoding means the compression algorithm finds a macroblock in the previous image (the reference image) that closely matches the macroblock to be encoded. The encoding for the new macroblock consists of a motion vector (which identifies the location of the referenced macroblock in the reference image) and a compressed representation of the difference between the encoded macroblock and the referenced macroblock.

Intra-encoding means the macroblock is encoded without reference to any other macroblock. This approach can be used if the algorithm is unable to identify a motion vector that provides more optimal encoding.

The main characteristic that distinguishes a more effective compression algorithm from a less effective one is the degree to which the algorithm always finds the optimal motion vector for each macroblock to be encoded. If the amount of time and CPU power available for searching is unlimited, then the encoder can simply perform an exhaustive evaluation of all macroblocks in the reference image in order to identify the motion vector that will produce the smallest encoding. More advanced algorithms can take it one step further by using multiple reference images before and sometimes even after the image being encoded. More advanced algorithms can also select fractional pixel displacements for motion vectors (because moving objects won't always exactly align with macroblock boundaries).

Using reference images after the image being encoded would not be an option if latency must be minimized when encoding live video images—for live video, the current image must be completely encoded and transmitted before the next image is captured.

In general, the CPU power currently available in digital cameras for surveillance and other applications is not sufficient for the most advanced video encoding methods. The camera must use a highly optimized method to locate acceptable motion vectors quickly. Even within cameras that implement the same encoding standard (like H.264), the quality of the implementation can vary significantly—some algorithms find more optimal motion vectors more quickly than other algorithms.

For any macroblock, the ideal motion vector would be one that identifies the location of an identical macroblock in the reference image. That can occur when an object has moved within the camera view but otherwise the pixels representing the object have not changed. In general, if you know that an object is moving within the camera view, then the macroblocks that made up that same object in the reference image should be among the most promising motion vectors.

For video surveillance, one is normally interested in moving objects—in particular we are interested in people and their activity. One is also interested in moving vehicles (because they are operated by people). Video analysis algorithms attempt to make sense out of the pixels in an image. These algorithms separate pixels into distinct objects (people, vehicles, etc.) and track the movement, behaviors, and interaction of objects.

It seems clear that if a video analysis algorithm has identified distinct objects and the movement of those objects from image to image, then that information should provide an ideal basis for selecting optimal motion vectors for image encoding.

In an example embodiment, a method for operating a video source is provided. The method includes capturing first video data of a scene including a moving object, and processing the first video data to determine a motion vector for the moving object. The method also includes capturing second video data of the scene including the moving object, and compressing the second video data using the motion vector producing compressed second video data.

Within a particular high resolution image, portions of the image may contain information that is relevant to surveillance (moving people and vehicles) while the majority of the image may depict relatively static portions of the scene that closely match thousands of previous images from the same camera.

One way to handle a fixed surveillance camera, such as that illustrated in FIG. 2, would be to store a complete image at maximum resolution only at a very long interval—maybe once every few hours for example—to capture the details of the static objects within the scene. These images could be stored separately and could be made available for reference when an operator is reviewing recorded video from the camera. Except for these reference images, all other images would use the following technique:

Capture an image at maximum resolution

Identify the regions of the image that contain objects of interest where maximum resolution may provide value. Divide those regions into macroblocks and encode those macroblocks at full resolution. Macroblocks may be 8 pixels by 8 pixels in size in some examples, while other embodiments may user macroblocks of other sizes.

Scale the image down to a lower resolution image—e.g. one half or one quarter the size of the original. Divide the lower resolution image into macroblocks and encode those macroblocks. If a macroblock in the lower resolution image corresponds completely to macroblocks already encoded at a higher resolution, that macroblock can be excluded from the lower resolution image.

It would be possible to apply this technique repeatedly so that a single image might be encoded in three or more different resolutions as opposed to only two resolutions.

Various law enforcement organizations including the FBI have published guidelines for the video resolution needed for specific purposes. These guidelines are expressed in terms of pixels per foot.

Overview detail is in the range of 20 to 30 pixels per foot. This is sufficient detail to track people and their movement but is not sufficient detail to recognize faces.

Forensic detail is sufficient detail to serve as legal evidence in order to identify a particular person or read a license plate. Most sources recommend at least 40 pixels per foot to recognize faces and at least 60 pixels per foot to read license plates.

High detail is sufficient to identify specific currency or casino chip values or small items being purchased at a point-of-sale terminal. High detail is 80 or more pixels per foot.

By combining knowledge about the role of the camera in the surveillance system with video analysis, an intelligent camera could encode images at variable resolution in order to provide the optimum resolution for the activity that is currently visible within the camera view.

If a video analysis algorithm detects that an original high resolution image includes a clear view of a person's face and the image provides at least 40 pixels per foot in the area where the face is detected, then the camera could retain full resolution for the macroblocks required to encode the image of the face. The camera could also generate metadata (where metadata is additional data stored separately from video images, describing the contents of the video images) to indicate that the image includes a face encoded with forensic detail.

If a camera uses video analysis to identify and track individuals, then the camera could capture a limited number of images of each person's face at forensic detail. The camera could identify and eliminate duplicate images showing exactly the same viewing angle of the person's face, but could retain additional images if images are captured at different viewing angles as the person moves within the camera view.

If a camera uses video analysis to identify license plates within the camera view, then the camera could retain an image of the license plate at forensic detail whenever that much detail becomes available. After an image has been captured at sufficient detail to read the license plate, there is no need for the camera to store additional images of the same license plate at forensic detail. Other images of the same vehicle should provide sufficient detail to see the make and model of the vehicle, the movement of the vehicle, and any visible information about the occupants of the vehicle.

For a camera that views a point-of-sale terminal, the camera could retain high detail of items on the conveyor and of cash-handling activity when the cash drawer is open. The camera could retain forensic detail of customers, employees, and merchandise scanning and bagging activity. Since employees typically enter the scene and then remain for long periods, there would be no need for the camera to repeatedly capture forensic detail of the employee's face—the camera should only retain enough detail to positively identify the employee when they arrive on the scene. For any uninterrupted sequence of images of the same employee, the metadata should identify the images that contain forensic detail to identify that employee. The camera would retain overview detail during periods when there is no customer present, the cash drawer is closed, and there is no activity of any known significance.

During video review, images could be displayed at low resolution initially. The low resolution macroblocks would be decoded first. Higher resolution macroblocks would be decoded and then scaled down to match the lower resolution macroblocks. The operator could select a portion of the image to be viewed in more detail. The application would determine if higher resolution macroblocks exist for that area, and would decode those macroblocks at full resolution. The application could automatically adjust the zoom level so that the selected area could be shown at full resolution—i.e. each pixel in the decoded image would correspond to one pixel in the displayed image.

If requested, the application could highlight the portions of the image where higher resolution is available for display. The application could leverage metadata generated and stored during video encoding to highlight objects and specific types of activity in the displayed video. The operator could keep the overview image displayed in one window and use separate windows to display regions of interest at higher resolution.

In an example embodiment, a method for operating a video source is provided. The method includes capturing video data of a scene, and processing the video data to determine an area of interest within the scene. The method also includes dividing the video data into macroblocks, determining the identity of the macroblocks including the area of interest, and encoding the macroblocks including the area of interest at a first resolution. The method further includes encoding the remaining macroblocks at a second resolution, wherein the first resolution is greater than the second resolution.

If a system, such as that illustrated in FIG. 1, uses video analysis to generate metadata during video encoding, that metadata can support rapid scanning and searching for specific types of activity. For example, an operator might want to review video of a doorway and see every person that went through that door during a period of time. If the metadata contains a history of the times at which the camera captured forensic detail of a new person arriving in the scene, then the application could leverage the metadata to quickly display images of each person. Searching metadata would be many times faster (and more efficient with system resources) than decoding and analyzing video images to detect activity. For example, what if only one person goes through that door on average in a 10 hour period? Instead of decoding and analyzing 10 hours worth of video images to find the next event of interest, the system might only need to search through a few kilobytes of metadata.

In an example embodiment, a method for operating a video source is provided. The method includes capturing video data of a scene, detecting an event within the video data, and placing an event timestamp including the date and time of the event in metadata corresponding to the video data.

Just like different numbers of pixels per foot are required to provide sufficient detail depending on the scene and the purpose of the camera, different numbers of images per second are required to capture activity that occurs at different speeds.

Intelligent cameras, such as that illustrated in FIG. 2, should capture and analyze images at the maximum frame rate available from the camera, and then based on an analysis of the activity the camera should decide which images need to be retained. Since the camera will not store images at a consistent frame rate, each image should include its own timestamp with millisecond precision.

When there is very little activity, the camera may drop down to a very low image rate—one frame per second or less.

To track normal movement of people walking through the camera view, a medium frame rate like 2-5 frames per second would be sufficient.

If a person is detected running through the camera view or if a vehicle drives through the camera view at high speed, the camera may need to retain several consecutive images at the maximum image refresh rate to capture sufficient images of the fast-moving subject.

For a camera that views a point-of-sale terminal, conveyor belt movement, merchandise scanning, and cash drawer activity would trigger higher frame rates, then the frame rate would slow down during low activity periods between transactions.

In an example embodiment, a method for operating a video source is provided. The method includes capturing video data comprising a plurality of frames of a scene, and identifying a first frame from the plurality of frames that includes a first aspect of an activity occurring within the scene. The method also includes subsequent to identifying the first frame, identifying at least a second frame from the plurality of frames that includes a second aspect of the activity occurring within the scene, and transferring the first frame and the second frame for delivery to storage.

Modern video compression methods like H.264 produce two types of compressed images:

I-Frames or intra-encoded frames are frames that can be decoded without referencing any other frame. I-Frames are also known as key frames.

P-Frames or predicted frames are frames that require one or more reference frames during decoding. P-Frames are also known as delta frames because they store the differences between frames.

A Group of Pictures or GOP is a sequence of images consisting of a key frame followed by the delta frames that depend on that key frame. The number of images in a GOP is the key frame interval. For example, if the key frame interval is 32, that means one out of every 32 images is a key frame.

It is common to use a fixed key frame interval, but an intelligent encoding algorithm could produce better results by selecting the optimum number of images to include in each GOP. When activity in the camera view is low, P-Frames will be small because very few macroblocks need to be encoded for each new image. In this situation, an intelligent camera, such as that illustrated in FIG. 2, can keep the video data rate as low as possible by continuing to extend the current GOP instead of encoding a key frame to start a new GOP.

The encoder should only encode a key frame to start a new GOP when there is a reason for doing that—the encoder should not adhere to a fixed key frame interval. Following are valid reasons for starting a new GOP:

Starting a new video file. Each video file must start with a key frame if a goal is to be able to decode all images in a video file without referencing any other video file.

Random access performance. During video playback, long sequences of images in a GOP can decrease responsiveness when a user attempts to reposition to a particular image within a GOP. To decode any particular image, the decoder must start with the key frame at the beginning of the GOP and then decode each successive image until the target image has been decoded. The maximum time required for random access to a particular image will depend on the maximum number of macroblocks that must be decoded in order to decode the selected image. Every GOP requires decoding all of the macroblocks in the key frame. After that, the number of macroblocks to be decoded depends on the amount of activity (which determines the number of macroblocks per image) and the number of images. When there are few macroblocks per delta frame because of low activity, the GOP can be extended to a larger number of images without causing excessive random access times. Conversely, when there is very high activity it may be necessary to reduce the number of images in a GOP in order to maintain an acceptable maximum random access time.

Accumulation of encoding errors. The encoding algorithm uses lossy compression when encoding the differences between images. Over time, the image that results from decoding successive delta frames can diverge from the image that would result from decoding a new key frame. If an intelligent camera has sufficient CPU power, it would be possible to encode a key frame for each captured image and then measure the encoding error of the image that would result from decoding the delta frames vs. the image that would result from decoding the key frame. To avoid having to transmit a new key frame, the encoder could select the macroblocks with the worst errors and encode and transmit those (using intra-encoding at the macroblock level if needed). If a large number of macroblocks have errors exceeding a threshold level, then it is time to end the current GOP and encode a new key frame.

In an example embodiment, a method for operating a video source is provided. The method includes capturing video data of a scene comprising a plurality of frames, opening a file for the video data, and storing a key frame in the file corresponding to a first of the plurality of frames. For each of the remaining plurality of frames, the method encodes the frame into macroblocks, determines a quantity of total macroblocks encoded since a last key frame was stored, and determines a quantity of macroblocks having errors since the last key frame was stored. The method also includes storing a new key frame when the quantity of total macroblocks encoded since the last key frame was stored exceeds a total encoded threshold, and storing a new key frame when the quantity of macroblocks having errors since the last key frame was stored exceeds an error threshold.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video system to generate and store encoded video comprising a plurality of key frames and a plurality of delta frames, the method comprising:
   capturing video data comprising a plurality of frames of a scene;
     selecting a fundamental view of at least a portion of the scene contained in the plurality of frames, wherein selecting the fundamental view includes flagging portions of the scene contained in the plurality of frames that do not have a most common view;
   generating the plurality of key frames from a first subset of the plurality of frames and the fundamental view of at least the portion of the scene;
   generating the plurality of delta frames from a second subset of the plurality of frames and the plurality of key frames; and
   transferring the encoded video for delivery to storage.

2. The method of claim 1, wherein the encoded video further comprises the fundamental view of at least the portion of the scene.

3. The method of claim 1, wherein selecting the fundamental view includes selecting one or more most common portions of the scene contained in the plurality of frames.

4. The method of claim 1, wherein generating the plurality of key frames includes selecting portions of the scene contained in the fundamental view that match corresponding portions of the scene contained in the first subset of the plurality of frames, and determining differences between portions of the scene contained in the fundamental view that do not match corresponding portions of the scene contained in the first subset of the plurality of frames.

5. The method of claim 1, further comprising:
   dividing the video data into a plurality of groups of frames; and
   selecting a first frame from each of the plurality of groups of frames as the first subset of the plurality of frames; and
   selecting remaining frames other than the first frame from each of the plurality of groups of frames as the second subset of the plurality of frames.

6. The method of claim 1, wherein each of the plurality of key frames includes a difference between a corresponding one of the first subset of the plurality of frames and the fundamental view.

7. The method of claim 1, wherein each of the plurality of delta frames includes a difference between a corresponding one of the second subset of the plurality of frames and a corresponding key frame.

8. A video system to generate and store encoded video comprising a plurality of key frames and a plurality of delta frames, the video system comprising:
   a video capture device configured to capture video data comprising a plurality of frames of a scene;
   a memory configured to store the encoded video; and
   a video processor coupled with the video capture device and the memory configured to:
     select a fundamental view of at least a portion of the scene contained in the plurality of frames, wherein selecting the fundamental view includes flagging portions of the scene contained in the plurality of frames that do not have a most common view;

generate the plurality of key frames from a first subset of the plurality of frames and the fundamental view of at least the portion of the scene;

generate the plurality of delta frames from a second subset of the plurality of frames and the plurality of key frames; and transfer the encoded video to the memory.

9. The video system of claim 8, wherein the encoded video further comprises the fundamental view of at least the portion of the scene.

10. The video system of claim 8, wherein selecting the fundamental view includes selecting one or more most common portions of the scene contained in the plurality of frames.

11. The video system of claim 8, wherein generating the plurality of key frames includes selecting portions of the scene contained in the fundamental view that match corresponding portions of the scene contained in the first subset of the plurality of frames, and determining differences between portions of the scene contained in the fundamental view that do not match corresponding portions of the scene contained in the first subset of the plurality of frames.

12. The video system of claim 8, wherein the video processor is further configured to:

divide the video data into a plurality of groups of frames; and select a first frame from each of the plurality of groups of frames as the first subset of the plurality of frames; and select remaining frames other than the first frame from each of the plurality of groups of frames as the second subset of the plurality of frames.

13. The video system of claim 8, wherein each of the plurality of key frames includes a difference between a corresponding one of the first subset of the plurality of frames and the fundamental view.

14. The video system of claim 8, wherein each of the plurality of delta frames includes a difference between a corresponding one of the second subset of the plurality of frames and a corresponding key frame.

15. A non-transitory computer-readable medium having instructions stored thereon for operating a computer system to generate and store encoded video comprising a plurality of key frames and a plurality of delta frames, wherein the instructions, when executed by the computer system, direct the computer system to:

capture video data of a scene, the video data comprising a plurality of frames;

select a fundamental view of at least a portion of the scene contained in the plurality of frames, wherein selecting the fundamental view includes flagging portions of the scene contained in the plurality of frames that do not have a most common view;

generate the plurality of key frames from a first subset of the plurality of frames and the fundamental view of at least the portion of the scene;

generate the plurality of delta frames from a second subset of the plurality of frames and the plurality of key frames; and transfer the encoded video for delivery to storage.

16. The non-transitory computer-readable medium of claim 13, wherein the encoded video further comprises the fundamental view of at least the portion of the scene.

17. The non-transitory computer-readable medium of claim 13, wherein selecting the fundamental view includes selecting one or more most common portions of the scene contained in the plurality of frames.

18. The non-transitory computer-readable medium of claim 13, wherein generating the plurality of key frames includes selecting portions of the scene contained in the fundamental view that match corresponding portions of the scene contained in the first subset of the plurality of frames, and determining differences between portions of the scene contained in the fundamental view that do not match corresponding portions of the scene contained in the first subset of the plurality of frames.

* * * * *